United States Patent Office 3,108,890
Patented Oct. 29, 1963

3,108,890
AQUEOUS CELLULOSIC COMPOSITIONS AND METHOD OF MAKING SAME
Garth H. Beaver, Midland, Mich., assignor to The Dow Chemical Company, Midland, Mich., a corporation of Delaware
No Drawing. Filed May 23, 1960, Ser. No. 30,745
12 Claims. (Cl. 106—186)

This invention relates to irradiated, substituted cellulosic materials, and more particularly to aqueous compositions containing said irradiated substituted cellulosic materials having stable viscosity characteristics and to methods of preparing such compositions.

Heretofore, essentially dry substituted cellulosic materials have been treated with high energy radiation to achieve degradation or chain scission of the cellulosic structure. When such degradation or chain scission occurs, aqueous solutions of the irradiated, cellulosic materials continue, gradually and progressively, to lose their viscosity upon standing. This radiation-induced, gradual, continuing loss of viscosity, or "viscosity drift" as termed herein, begins immediately upon dissolving cellulosic materials, irradiated when essentially dry, and continues indefinitely thereafter in a decreasing, yet appreciable manner, thereby precluding the preparation of solutions which display a constant viscosity for prolonged periods.

An object of this invention is to provide aqueous solutions containing irradiated, substituted cellulosic materials which do not possess the viscosity drift characteristic heretofore described. Another object of this invention is to provide a means whereby irradiated, substituted cellulosic materials may be dissolved in aqueous solutions without experiencing appreciable viscosity drift. Other objects of this invention will become apparent hereinafter.

Unexpectedly, it has been discovered that when irradiated, substituted cellulosic materials are dissolved in aqueous media and said media are thereafter altered with an alkalizing agent to produce a hydrogen ion concentration represented by a pH of between about 5.5 and about 11.5, the viscosity drift heretofore experienced is substantially obviated.

The radiation, as used herein, includes all forms of radiation hereinafter described when the irradiation is carried out under sufficiently dry conditions whereby chain scission or degradation of cellulosic structures is achieved rather than insolubilization. In general, the energy of the ionizing radiation may range from about 5,000 to 20 million electron volts or higher depending upon materials and the shape and thickness of the materials. Although high-energy electron radiation is preferred, since it produces a large amount of easily controllable, high-energy radiation within a short period of time without instilling harmful radioactivity in the product, many other sources of high-energy ionizing radiation may also be used. Examples of such radiation sources are electron sources, such as the betatron, etc.; fast or slow neutrons, such as are present in certain atomic reactors; X-rays; and other miscellaneous sources, such as gamma rays, protons, deuterons, alpha particles, fission fragments, such as are available from cyclotrons, and the like.

Substituted cellulose materials within the scope of this invention are derivatives of polymers of anhydroglucose units having the following type structure:

The preferred substituted cellulose materials are cellulose ethers, such as alkyl cellulose (e.g. methyl-, ethyl-, propyl-, etc. cellulose), hydroxyalkyl cellulose (e.g. hydroxyethyl-cellulose), hydroxyalkyl alkyl cellulose (e.g. hydroxypropyl methyl cellulose, etc.), carboxyalkyl cellulose (e.g. carboxmethylcellulose), alkyl carboxyalkyl cellulose (e.g. methyl carboxymethylcellulose) and the like including combinations thereof.

Suitable alkalizing agents as contemplated herein, comprise alkali and alkaline-earth metal hydroxides and salts of weak acids as well as ammonia, amines, and quaternary ammonium compounds or complexes. For example, such acid-neutralizing compounds include sodium, potassium and ammonium hydroxides, carbonates, bicarbonates, acetates and hypochlorites as well as amines, quaternary amines and other compounds capable of forming hydroxyl ions or reacting with an acid to form the corresponding acid salt.

As will be displayed in the examples hereinafter, cellulosic solutions prepared by the foregoing method are surprisingly free from viscosity drift, thereby allowing preparation and prolonged utilization of such solutions in paste and pharmaceutical applications in a manner not heretofore attainable.

The following examples are given to illustrate the present invention, but are not to be construed as limiting the invention thereto.

Example I

Essentially dry methyl cellulose (Methocel Brand, 410 cps.) was subjected to 10 megrarad radiation by means of a Van de Graaff electron accelerator. Following radiation, the methyl cellulose was dissolved in water and divided into three samples. Thereafter, two of the three aqueous solutions (Samples 1 and 2) were treated with 0.1 N sodium hydroxide to alter the pH in varying degrees while the third solution (Sample 3) having a pH of 3.8 was retained in its unmodified state to serve as control. The viscosities of the solutions were determined with an Ubbelohde viscosimeter at intervals as indicated below. The results are summarized in the following table:

| Time After Sodium Hydroxide Addition | Sample 1 | | Sample 2 | | Sample 3 | |
|---|---|---|---|---|---|---|
| | Viscosity (cps. at 20° C.) | pH | Viscosity (cps. at 20° C.) | pH | Viscosity (cps. at 20° C.) | pH |
| 1 hour | 138 | 7.0 | 80 | 10.0 | 222 | 3.8 |
| 24 hours | 116 | 4.9 | 69 | 7.3 | 138 | 3.4 |
| 96 hours | 104 | 4.6 | 66 | 7.0 | 116 | 3.4 |

Example II

Samples of essentially dry methyl cellulose (Methocel Brand, 25 cps.) were subjected to varying doses of radiation by means of a Van de Graaff electron accelerator. Following irradiation, portions of the methyl cellulose were divided into two samples for each radiation dose and dissolved in water. Thereafter, one of the two aqueous samples (Sample 1) was neutralized to a pH of 7.0 with 0.1 N sodium hydroxide, while the other sample (Sample 2) was retained in its unmodified state to serve as control. Solution viscosities were determined with an Ubbe-

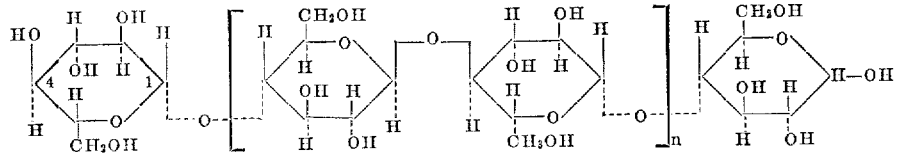

Iohde viscosimeter at intervals indicated below with the following results obtained:

| Time After Sodium Hydroxide Addition | Radiation Dosage (megarads) | Sample 1 Viscosity (cps. at 20° C.) | Sample 2 Viscosity (cps. at 20° C.) |
|---|---|---|---|
| 1 hour | 2 | 16.8 | 30.5 |
| 1 day | 2 | 16.6 | 26.3 |
| 4 days | 2 | 16.6 | 25.3 |
| 31 days | 2 | 16.1 | 21.2 |
| 1 hour | 5 | 6.7 | 12.3 |
| 1 day | 5 | 6.7 | 10.4 |
| 4 days | 5 | 6.7 | 9.8 |
| 31 days | 5 | 6.6 | 8.8 |
| 1 hour | 7.5 | 4.5 | 7.8 |
| 1 day | 7.5 | 4.5 | 6.7 |
| 4 days | 7.5 | 4.5 | 6.4 |
| 31 days | 7.5 | 4.4 | 5.7 |

*Example III*

In a manner similar to the foregoing Example II, samples of essentially dry carboxymethyl cellulose (CMC–70M Brand) were subjected to varying doses of irradiation by means of a Van de Graaff electron accelerator. Following irradiation, portions of said carboxymethyl cellulose were divided into two samples for each radiation dose and dissolved in water. Thereafter, one of the two aqueous samples (Sample 1) was treated with sufficient 0.1 N sodium carbonate solution to produce a pH of 10.0 while the other sample (Sample 2) was retained in its unmodified state to serve as control. Solution viscosities were determined in the same manner as those in the foregoing Examples I and II; the following results were obtained:

| Time After Sodium Carbonate Addition | Radiation Dosage (megarads) | Sample 1 Viscosity (cps. at 20° C.) | Sample 2 Viscosity (cps. at 20° C.) |
|---|---|---|---|
| 1 hour | 5 | 12.1 | 14.9 |
| 1 day | 5 | 11.1 | 14.6 |
| 4 days | 5 | 10.7 | 14.2 |
| 7 days | 5 | 10.6 | 13.9 |
| 14 days | 5 | 10.5 | 13.5 |
| 1 hour | 10 | 6.0 | 7.3 |
| 1 day | 10 | 5.5 | 7.1 |
| 4 days | 10 | 5.3 | 7.0 |
| 7 days | 10 | 5.2 | 6.8 |
| 14 days | 10 | 5.2 | 6.6 |

*Example IV*

Samples of essentially dry hydroxyethyl cellulose (Cellosize, WP–300 Brand), ethyl cellulose (Ethocel Brand, 50 cps.) and hydroxypropyl methyl cellulose (Methocel, Brand, 60 HG) were subjected to both 5 and 10 megarad doses of irradiation by means of a Van de Graaff accelerator. The irradiated samples of hydroxyethyl cellulose and hydroxypropyl methyl cellulose were thereafter dissolved in sufficient water to form two percent by weight aqueous solutions while 5 grams of the irradiated samples of ethyl cellulose were dissolved in 90 grams of ethanol and 8 grams of water. The resulting aqueous and organo-aqueous solutions were then each halved with one of such halves treated with a 1 N aqueous sodium hydroxide solution to produce a pH of 10.0. Viscosity comparisons were carried out over prolonged periods between the untreated, irradiated samples and the irradiated samples treated with sodium hydroxide. In every case, viscosity drift had been substantially obviated in the sodium hydroxide treated samples in the same manner and to the same degree as heretofore recorded in the preceding examples.

Results similar to those tabulated in Examples I, II, III and IV have been achieved while utilizing substituted cellulosic materials as well as combinations thereof, alkalizing agents and solvents not specifically disclosed in said examples, but explained in the foregoing specification; and, it is to be understood that I limit myself only as defined in the appended claims.

I claim:
1. A process which comprises dissolving in an aqueous solvent, an irradiated cellulose ether soluble in aqueous solvents with sufficient alkalizing agent to produce an aqueous solution of the cellulose ether having a pH of between about 5.5 and 11.5, said irradiated cellulose ether having been formed by subjecting the ether to sufficient high energy ionizing radiation to cause chain degradation.

2. A process which comprises irradiating a cellulose ether soluble in aqueous solvents with high energy ionizing radiation in an amount sufficient to cause chain degradation and dissolving said irradiated ether in an aqueous solvent with sufficient alkalizing agent to produce a solution having a pH of between about 5.5 and 11.5.

3. An aqueous solution of an irradiated cellulose ether soluble in aqueous solvents prepared in accordance with the method of claim 2.

4. The process of claim 2 wherein the cellulose ether is an alkyl cellulose.

5. The process of claim 4 wherein the alkyl cellulose is methyl cellulose.

6. The process of claim 4 wherein the alkyl cellulose is ethyl cellulose.

7. The process of claim 2 wherein the cellulose ether is a carboxyalkyl cellulose.

8. The process of claim 7 wherein the carboxyalkyl cellulose is carboxymethyl cellulose.

9. The process of claim 2 wherein the cellulose ether is a hydroxyalkyl cellulose.

10. The process of claim 9 wherein the hydroxyalkyl cellulose is hydroxyethyl cellulose.

11. The process of claim 2 wherein the cellulose ether is a hydroxyalkyl alkyl cellulose.

12. The process of claim 11 wherein the hydroxyalkyl alkyl cellulose is hydropropyl methyl cellulose.

References Cited in the file of this patent
UNITED STATES PATENTS 2,480,949    Morison _____ Sept. 6, 1949

UNITED STATES PATENT OFFICE
CERTIFICATE OF CORRECTION

Patent No. 3,108,890                          October 29, 1963

Garth H. Beaver

It is hereby certified that error appears in the above numbered patent requiring correction and that the said Letters Patent should read as corrected below.

Column 4, after line 58, insert the following:

2,682,536     Mitchell -------- June 29, 1954
2,947,645     Milne ---------- Aug. 2, 1960

OTHER REFERENCES

Bovey, "Effects of Ionizing Radiation on Natural and Synthetic High Polymers," 1958, Interscience Publishers, Inc., page 191.

Signed and sealed this 12th day of May 1964.

(SEAL)
Attest:

ERNEST W. SWIDER                       EDWARD J. BRENNER

Attesting Officer                       Commissioner of Patents